United States Patent
Stüwe

(10) Patent No.: US 6,944,520 B2
(45) Date of Patent: Sep. 13, 2005

(54) SYSTEM AND METHOD FOR COMMUNICATION BETWEEN MACHINE CONTROLLERS

(75) Inventor: Hans-Joachim Stüwe, Sachsen (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 10/861,773

(22) Filed: Jun. 4, 2004

(65) Prior Publication Data

US 2005/0021168 A1 Jan. 27, 2005

(30) Foreign Application Priority Data

Jun. 5, 2003 (DE) .......................... 103 25 466

(51) Int. Cl.$^7$ .............................................. G06F 19/00
(52) U.S. Cl. ....................................................... 700/141
(58) Field of Search ........................ 714/7, 11; 700/21, 700/79, 96, 130, 131, 132, 134, 136, 137, 138, 139, 141; 709/208, 227

(56) References Cited

U.S. PATENT DOCUMENTS 4,347,563 A * 8/1982 Paredes et al. ............... 700/8
5,963,448 A * 10/1999 Flood et al. ................ 700/82
6,615,091 B1 * 9/2003 Birchenough et al. ........ 700/96

FOREIGN PATENT DOCUMENTS

| DE | 198 37 650 A1 | 3/2000 |
| DE | 101 05 668 A1 | 10/2002 |
| WO | WO 03/40449 A1 | 5/2003 |

* cited by examiner

Primary Examiner—John J. Calvert
Assistant Examiner—Brian Kauffman
(74) Attorney, Agent, or Firm—Henry M. Feiereisen

(57) ABSTRACT

A communication system and a method for data exchange between machine controllers, in particular machine controllers of knitting machines, are described. The communication system and method use for communication a standard e-mail application protocol, so that any form of e-mail can be automatically transmitted by a mail client from one machine to another machine. This is particularly advantageous when one machine fails and the order processed by that machine must be forwarded by e-mail to another machine for further processing.

9 Claims, 1 Drawing Sheet

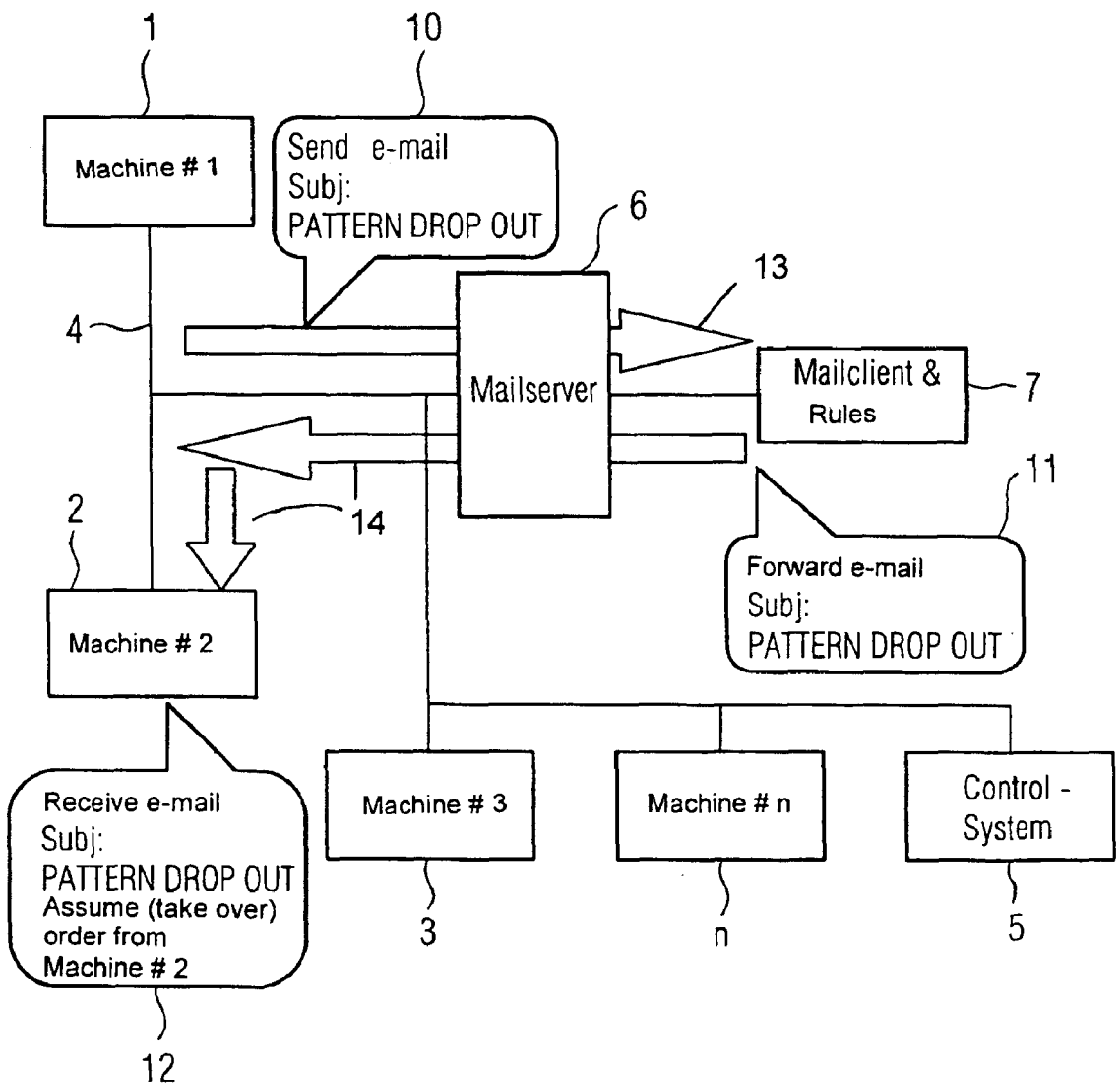

SYSTEM AND METHOD FOR COMMUNICATION BETWEEN MACHINE CONTROLLERS

CROSS-REFERENCES TO RELATED APPLICATIONS

This application claims the priority of German Patent Application, Serial No. 103 25 466.8, filed Jun. 5, 2003, pursuant to 35 U.S.C. 119(a)–(d), the disclosure of which is incorporated herein by reference.

BACKGROUND OF THE INVENTION

The present invention relates to a communication system for communication between machine controllers, in particular machine controllers for knitting machines, that are connected by a network. The present invention also relates to a method for communicating between such machine controllers.

It is known to connect several machines, such as knitting machines, and/or the controllers of such machines via a communication network. The data exchange and the interaction between the machine controllers themselves and between a machine controller and one or more host computers is typically based on proprietary controllers and protocols. Examples of such proprietary controllers are BARCO-Vision, Oricontrol (Orizio), and Selan (Stoll/Flachstricken). These controllers use exclusively LAN or fieldbus technology, which disadvantageously requires complex programming and lacks an intuitive interface.

It would therefore be desirable to provide an improved communication and configuration between machine controllers, in particular controllers for knitting machines, to obviate prior art shortcomings and to provide a more user-friendly interface.

SUMMARY OF THE INVENTION

According to one aspect of the invention, a communication system for communication between machine controllers, in particular machine controllers for knitting machines, includes a network device connecting the machine controllers with each other, and a message transmission unit operating according to an e-mail standard, for transmitting e-mail messages between two or more of the machine controllers via the network device.

According to another aspect of the invention, a method for communicating between machine controllers, in particular machine controllers for knitting machines, includes the act of transmitting messages conforming to an e-mail standard via a network device that connects the machine controllers with each other.

By using a standard e-mail application protocol conforming to the RFC standard (821/SMTP, 822/text messages, 1939/POP3) between the individual controllers and the host computer(s), a large number of widely used and standardized mail-client programs is available. Accordingly, the data paths and the interactions between the machine controllers can be configured flexibly and cost-effectively using standard software. The controllers and/or a supervisory/master control system typically do not have to know or provide details of the configuration.

According to one advantageous embodiment of the invention, the communication system can further include a computer device configured as a mail client and connected via the network device with the machine controllers. By setting corresponding rules in the mail client and by defining corresponding fields, for example fields relating to topics and subject headings in the e-mail, the data exchange and interaction from and to the controllers can be easily configured.

Advantageously, a mail server can be integrated with the network device. The communication system can then be configured so that e-mail is transmitted from a first machine controller to a second machine controller via the mail server and the computer device that is configured as a mail client. This in turn makes it possible for the computer device to automatically determine the recipient of the e-mail based on the rules defined in the computer device.

According to another advantageous embodiment of the invention, the e-mail message can includes state information of the machines, command information and/or a knitting pattern. For example, in the event that a knitting machine fails, an order that is processed on that particular knitting machine can then be automatically transmitted to another knitting machine. The knitting machine receiving the e-mail message can either accept and process the order, or can indicate in a return e-mail that it is not configured to process the order.

BRIEF DESCRIPTION OF THE DRAWING

Other features and advantages of the present invention will be more readily apparent upon reading the following description of currently preferred exemplified embodiments of the invention with reference to the accompanying drawing, in which the sole FIGURE shows schematically a communication system with machine controllers communicating via a mail server.

DETAILED DESCRIPTION OF PREFERRED EMBODIMENTS

The depicted embodiment is to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the sole FIGURE, there is shown a communication system with several machines or machine controllers 1, 2, 3 . . . n that are connected with each other by a communication network 4. Also connected to the communication network 4 is a control system 5 for, for example, placing orders with the various machines 1, 2, 3 . . . n.

The machines 1, 2, 3 . . . n communicate over the network 4 by using a standardized e-mail application protocol, for example a protocol according to the RFC standards 821/SMTP, 822/text messages, and 1939/POP3. A mail server 6 that is integrated in the network 4 supports the communication. To facilitate communication, one or more host computers serving as mail clients are also connected to the communication network 4.

The communication system makes it possible to automatically compensate for a failure of one of the knitting machines 1, 2, 3 . . . n. This will now be described in detail with reference to the following example: Assuming that an order for machine 1 must be processed with a high priority. If this machine 1 fails, for example due to a mechanical or electrical defect, then another suitable machine, in this example machine 2, must interrupt processing of its present order and take over the order processed on machine 1, with the knitting pattern from machine 1. It will be understood that this may be possible only if machine 2 has the same configuration as the machine 1, or has at least access to the same supplies.

After the machine 1 has failed, it sends, for example, an e-mail with the subject heading "PATTERN DROP OUT", which indicates a pattern failure. The actual pattern can be sent together with the e-mail or appended to the e-mail. The transmission of the e-mail from machine 1 is indicated in the FIGURE as process step 10.

As indicated by the arrow 13 in the FIGURE, the e-mail is sent via the mail server 6 to a mail client 7 which can be a host PC. The following rule is stored in the mail client 7: if e-mail is received from machine 1 (or from any other machine) with a subject heading "PATTERN DROP OUT", then this e-mail, including the appended pattern, is automatically forwarded to the machine 2 (or to a machine other than the machine that sent the e-mail). The forwarding step is indicated in the FIGURE as step 11, and the e-mail is transmitted via the mail server 6 to the machine 2, as indicated by arrow 14.

The machine 2 receives the e-mail in step 12 and interprets the received e-mail with the subject heading "PATTERN DROP OUT" as a new order. The machine 2 then uses the pattern included in or appended to the e-mail as a new working pattern. Other parameters, such as a specified quantity etc., can also be transmitted in the same e-mail or in another e-mail.

In this way, data paths between the machines and interaction between the machines can be configured flexibly and cost-effectively using standard e-mail software. Advantageously, the machines need not be aware of each other's presence.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A communication system for communication between knitting machines, comprising:
   a first knitting machine and at least one other knitting machine;
   a network device connecting the first knitting machine with the at least one other knitting machine,
   wherein the first knitting machine automatically generates a message according to an e-mail standard, said message including state information indicating a failure of the first knitting machine and a knitting pattern produced or to be produced by the first knitting machine, and transmits the message via the network device to the at least one other knitting machine.

2. The communication system of claim 1, further comprising a computer device configured as a mail client and connected via the network device with the knitting machines.

3. The communication system of claim 2, further comprising a mail server that is integrated with the network device, wherein the message is transmitted from the first knitting machine to the other knitting machine via the mail server and the computer device.

4. The communication system of claim 2, wherein the computer device automatically determines a recipient of an e-mail message.

5. The communication system of claim 1, wherein the e-mail standard includes a standard selected from 821/SMTP, 822/text messages, and 1939/POP3.

6. A method for communication between knitting machines, comprising
   a first of the knitting machines automatically generating a message and transmitting the message to another of the knitting machines in conformance with an e-mail standard via a network device that connects the knitting machines with each other,
   said message including state information indicating a failure of the first knitting machine and a knitting pattern produced or to be produced by the first knitting machine.

7. The method of claim 6, wherein an e-mail message is transmitted from the first knitting machine to the other knitting machine via a mail server and a computer configured as a mail client.

8. The method of claim 7, wherein the computer automatically determines a recipient of the message.

9. The method of claim 6, wherein the e-mail standard includes a standard selected from 821/SMTP, 822/text messages, and 1939/POP3.

* * * * *